United States Patent
Moore, Jr. et al.

[11] 3,885,932
[45] May 27, 1975

[54] DUST FILTRATION SYSTEM

[75] Inventors: Lionel G. Moore, Jr.; Thomas P. Flynn, both of Milwaukee, Wis.

[73] Assignee: Super Products Corporation, Milwaukee, Wis.

[22] Filed: Jan. 10, 1974

[21] Appl. No.: 432,243

[52] U.S. Cl. ............... 55/314; 55/319; 55/341; 55/350; 55/419
[51] Int. Cl. ........................................ B01d 46/44
[58] Field of Search ............ 55/309, 312, 314, 315, 55/318, 319, 341, 342, 410, 417, 418, 467, 419, 350; 15/347, 348, 349, 352, 353; 210/299, 340, 341

[56] References Cited
UNITED STATES PATENTS

| | | | |
|---|---|---|---|
| 2,657,416 | 11/1953 | Smith | 15/353 X |
| 3,406,423 | 10/1968 | Young | 15/347 x |
| 3,541,631 | 11/1970 | Kluge et al. | 15/352 X |
| 3,587,130 | 6/1971 | Young | 15/352 |

FOREIGN PATENTS OR APPLICATIONS

| 903,890 | 12/1953 | Germany | 55/418 |
|---|---|---|---|

*Primary Examiner*—Frank W. Lutter
*Assistant Examiner*—David L. Lacey

[57] ABSTRACT

A vacuum cleaning or loading device of the type including a means for filtering airborne fine particulate material also includes a back-up filter system for protecting the vacuum exhauster or blower. A by-pass system may preferably be used with the back-up filtration system to protect the primary filter media when the cleaner or loader is being used for collection of liquids. The device may be self-propelled or stationary and may be used for various collecting, loading, transportation or cleaning jobs.

7 Claims, 5 Drawing Figures

PATENTED MAY 27 1975 3,885,932

SHEET 1

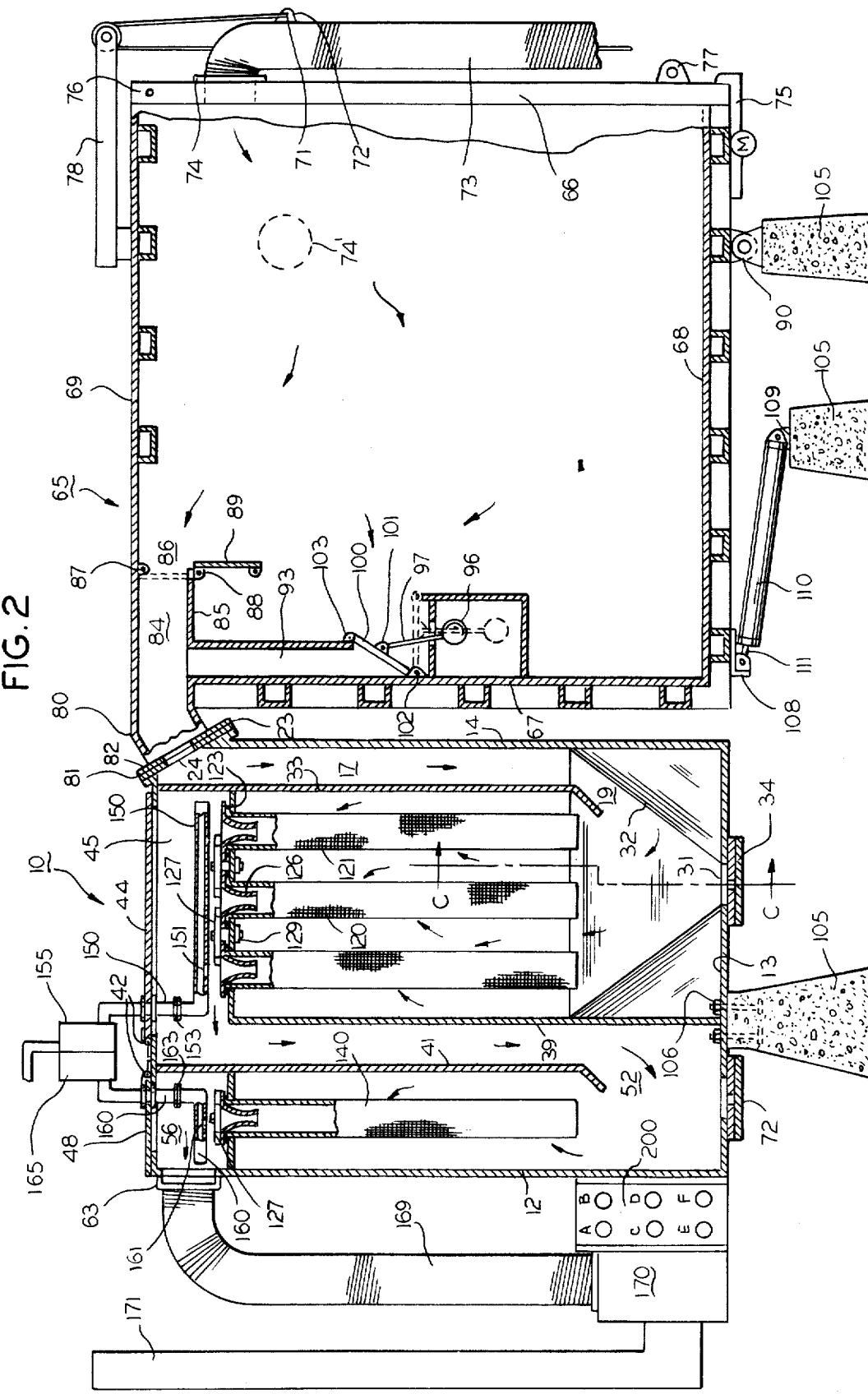

DUST FILTRATION SYSTEM

BACKGROUND OF THE INVENTION

This invention pertains generally to the art of industrial vacuum loaders or cleaners. Such machines have become increasingly important in recent years because they allow their users to increase efficiency of their operations by conserving valuable materials, by reducing labor costs and by simultaneously providing cleaner and safer work environments. Such machines are commonly employed in foundries, mines, grain storage vessels, primary metals plants, minerals processing plants, municipal streets and other areas where loose materials should desirably be collected, either to recover their economic value or for purposes of cleanliness and safety. The increased interest in machines of this type has been accompanied by a corresponding development of the technology involved in their construction. Early machines, typified by leaf pick-up vehicles, employed a fan through which debris passed during collection. Later models employed exhasut type vacuum fans to suck debris through an intake hose and deposit it in a collection hopper without debris passing through the fan. Screens were sometimes employed to protect the fans, and some machines sprayed water into the air stream to remove entrained particles. Still more advanced models have employed multistage centrifugal blowers in place of single stage fans.

One known system for loading and cleaning, using such a centrifugal pump, utilizes a flexible vacuum intake hose for conveying refuse or other material into a main collection hopper. In such a system, the vacuum blower or exhauster is separated from the main hopper by a filtration means for protecting the vacuum blower from fine dust particles which may become entrained in the air stream flowing through the system. One known means for filtering dust particles utilizes filter bags for collecting the dust and reverse air flushing for periodically cleaning the filter bags. The basic principles of this type of filter are disclosed in U.S. Reissue Pat. No. 24,954 for an "Apparatus for Filtering Solids from Gas-Solid Suspensions" issued May 28, 1961. Another filtration system utilizes a fabric filter media stretched over a plurality of parallel bars to form a continuous series of bags. A representative system of this type is described in U.S. Pat. No. 3,186,021 for "Power Sweeper," issued June 1, 1965 to Krier et al. The Krier el al "bags" are cleaned by shaking the parallel bars to remove accumulated dust. Yet another filtering arrangement provides open bottomed bags which are pulsed with blasts of compressed air to expand the bags and flake off dust accumulations.

The filtering devices discussed above may be used in a variety of industrial operations such as vacuum cleaning of debris from fatories or foundries, street cleaning, loading or conveying of wheat and other grains, leaf pick-up etc. One problem which is frequently encountered with the prior vacuum cleaners and loaders is that the fan is damaged if the filtration system fails thereby allowing large amounts of dust to pass into the fan. This problem is compounded if positive displacement pumps are used in place of vacuum pumps. Positive displacement pumps are advantageously employed in large vacuum machines because they possess increased efficiency over centrifugal fans and fuel consumption for positive displacement pumps is as much as 50% of that required by centrifugal pumps. In addition, velocity and vacuum control can be more precise using positive displacement pumps. The difficulty up until now, however, has been that positive displacement pumps are much more susceptible to damage if filter bags fail and large amounts of dust are allowed to enter the pump.

Another problem with prior devices arises when a single machine is used to collect or load both solids and liquids. During the collection of liquid materials, the filtering media usually becomes damp, and upon switching the unit for collection of solid materials, airborne dust can form a cement-like cake on the filter. The cake cannot be removed by the normal cleaning procedure. On proposed solution to this latter problem has been to bypass the filtering media when liquids are collected. This may be accomplished by providing a manually operated switching device, and the machine operator makes whatever adjustments are necessary depending on the current use of the machine. Any error in judgment on the part of the operator could quickly result in vacuum pump damage. Because of the relatively high expense involved in the purchase of large vacuum loaders and cleaners of this type, downtime occasioned by the need to replace the filtering media or to repair or replace the vacuum pump can be costly.

A still further problem with the prior art filtration units is that they are relatively inflexible and are usually designed for a specific machine, i.e., one mounted on a truck chassis or one designed for stationary units. Those who may need filters for several types of vacuum units would then need to purchase several different filtration units, whereas such would not be the case if the filtering system were adapted to be readily connected to different vacuum cleaners and loaders.

SUMMARY OF THE INVENTION

It is a primary object of this invention to provide a bag filtration housing including both a primary filtration means and a back-up filtration means for fan or vacuum pump protection.

It is another object of the invention to provide a filtration system for vacuum cleaners and loaders including a by-pass arrangement for directing the air stream around the primary filtration means directly to a secondary or back-up filtration means.

It is yet another object of the invention to provide a filtration system which is readily adaptable to existing vacuum loaders and cleaners of both the mobile and stationary types.

It is a further object of the invention to provide a filtration means for industrial vacuum loaders and cleaners having increased filter lifetime.

It is yet a further object of the invention to provide a filtration means for industrial vacuum cleaners and loaders including an easily manipulated switching mechanism, operable when a single unit is to be used for collection of both liquid materials and solid materials.

A still further object of the invention is to provide an industrial vacuum loader and cleaner including a float control mechanism for preventing blower of filter damage caused by overloading of the main collection hopper when liquids are being collected.

How these and other more specific objects of the present invention are accomplished will be described in the following more detailed description of a preferred embodiment of the invention taken in conjunction with the drawings. Generally, however, the invention includes a filtration housing divided into chambers which are so arranged that the vacuum air stream may selectively be passed through either a primary and a secondary filtration system or only through the secondary filtration system. In a preferred embodiment of the invention, a series of tubular fabric filter bags are used as the filtration media in both the primary and secondary filtration chambers, but the secondary filtration bags have a larger average pore size than those of the primary filter bags. A reverse air flushing system is preferably used in conjunction with all the tubular fabric filter bags for periodically cleaning the exterior bag surfaces of accumulated dust. Such cleaning of the exterior bag surfaces may be accomplished automatically. A quick switching means is also preferably employed to enable selection of air flow paths through the housing. In the first path, air travels through the primary filtration bags, through a plenum above the primary filtration bags, down a connecting passageway and up through secondary filter bags, while in the second path, air passes directly to the secondary filter bags. A float mechanism is also preferably employed when the machine is being used for collecting liquids to prevent the liquid from entering the filter housing or the blower. The embodiment to be described in detail below may be adapted for industrial cleaning and loading in either stationary or mobile modes of operation.

DESCRIPTION OF THE DRAWINGS

FIG. 2 is a vertical section through the line A—A of the filter housing of FIG. 1 together with main collection hopper and illustrating air flow in the solid collection mode of operation;

DESCRIPTION OF A PREFERRED EMBODIMENT

Figure 1:
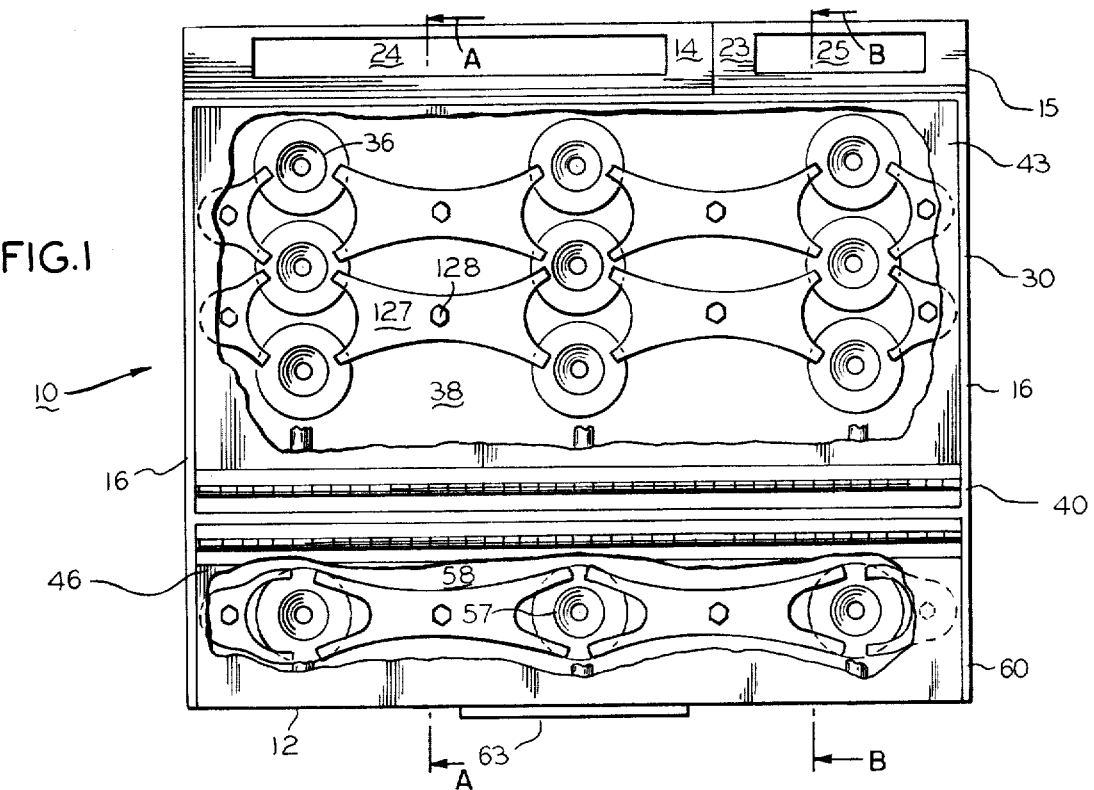
FIG. 1 is a top view of a preferred filter housing according to the present invention showing generally the location of the filter bags and the multi-chamber arrangement.

Because of the unusual design of the filtration bag housing of the present invention, it is difficult to describe the housing with reference to a single figure, and, accordingly, reference will simultaneously be made to FIGS. 1-5. FIG. 1 is a top view of a filter housing 10 shown to include a front wall 12, rear wall 14, side walls 16 and bottom 13 (not shown). While these walls are shown to be reinforced sheet metal in the drawings, any known materials for constructing flat walled vacuum chambers of large size may be employed. Housing 10 is a generally rectangular box. The front and rear notations used in the description of the preferred embodiment will be more fully understood by reference to FIGS. 2 and 3 wherein housing 10 is located generally in front of (and to the left of in the drawings) a main collection chamber 65, the air flow being from the main collection chamber 65 through housing 10, through a connecting hose 169 to a vacuum pump 170, and out an exhaust stack 171. Proceeding generally from the rear wall 14 to the front wall 12, housing 10 is generally divided into four sections by a series of vertical partitions. The first section 15 contains the intake passageways 17 and 18 (See FIGS. 2 and 3). The second section is the primary filter section 30. The third section is a passageway 40 in front of the primary section 30. The fourth section is the secondary filtration section 60.

Figure 3:
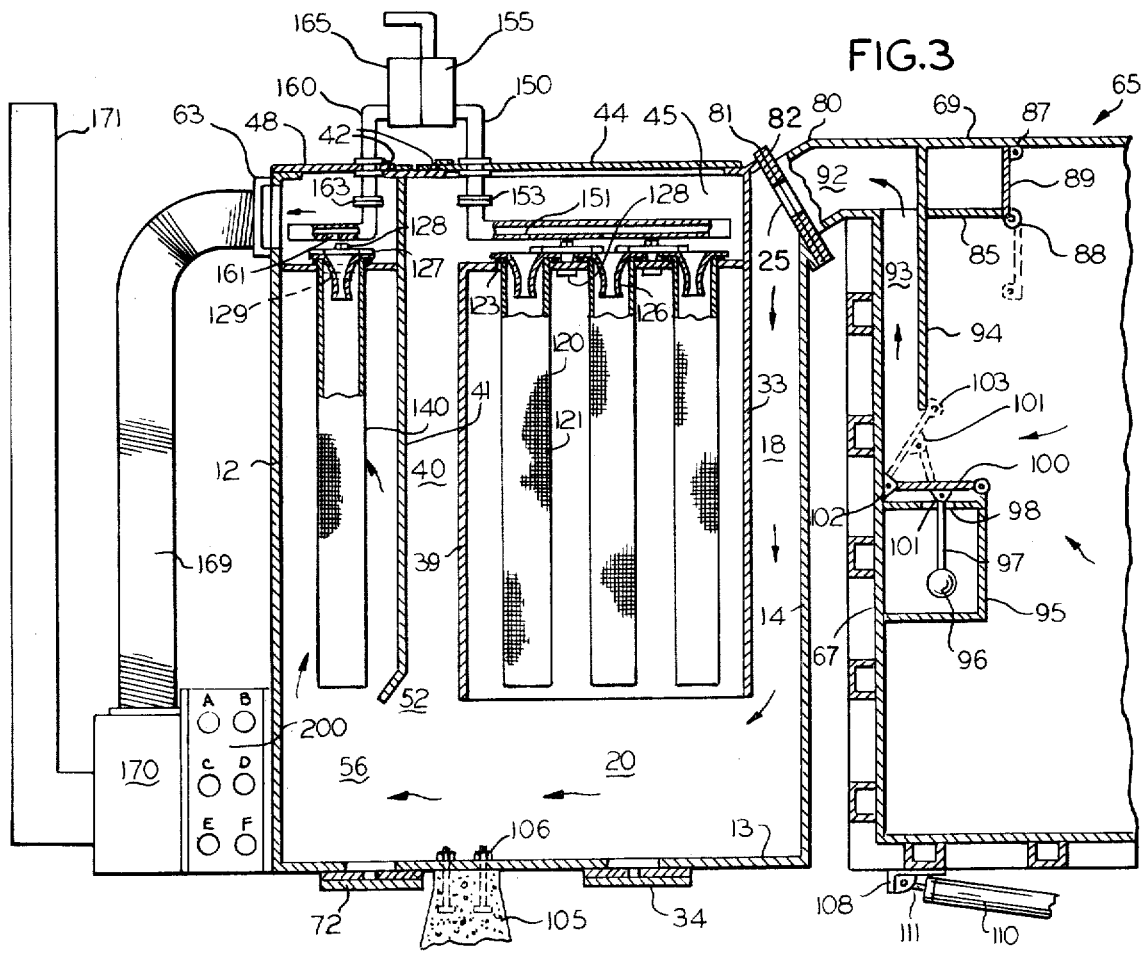
FIG. 3 is similar to FIG. 2 and is a side vertical section through the line B—B of FIG. 1 showing the main collection chamber in conjunction with the housing shown in FIG. 1, but illustrating the liquid collection mode of operation.
Figure 4:
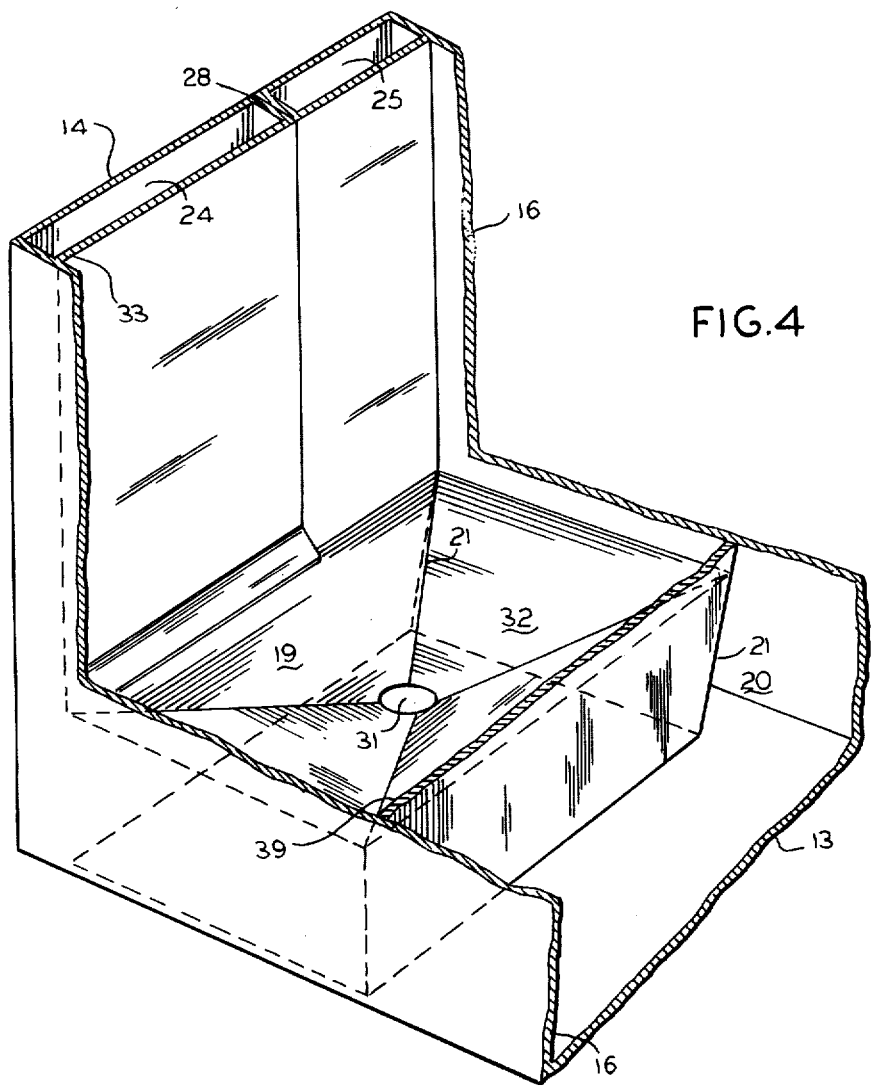
FIG. 4 is a cut-away oblique view of the housing illustrated in FIG. 1 showing the construction of the by-pass duct and the primary and secondary filter chambers of FIGS. 1-3.
Figure 5:
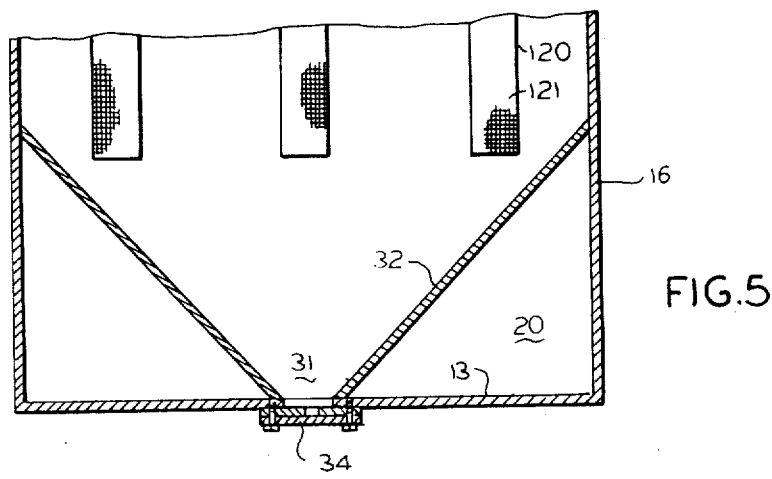
FIG. 5 is a rear sectional view taken along the line C—C of FIG. 2 showing the orientation of the filter bags and the by-pass duct.

Section 15 is vertically divided into two passageways extending from the top of housing 10 down towards the bottom of housing 10 by a longitudinal partition 28. Passageway 17 terminates in an opening 19 into the primary filter section 30. The other passageway 18 of chamber 15 defines a passageway from the top portion of the housing 10 down to a by-pass duct 20 which passes longitudinally below main filter section 30 and into the secondary filtration section 60. A metal plate 23 having openings 24 and 25 is welded or otherwise attached transversely over the top of the first section 15. Opening 24 leads to passageway 17, while opening 25 leads to passageway 18. The opening 19 of passageway 17 into the primary filtration chamber 30 can be seen in FIG. 2, while the opening 56 of the by-pass duct 20 into the secondary filtration chamber 60 is shown in FIG. 3.

The bottom of the main collection section 30 is formed generally in the shape of an inverted pyramid by bottom walls 32 which define a receptacle 31 for the dust collected in section 30. An opening 34 is provided at the bottom of the inverted pyramid for removal of collected material. It has been determined that a steep incline of walls 32 allows a greater percentage of material to collect in receptacle 31. A preferred angle would be approximately 60°. Main collection chamber 30 is further defined by a rear wall 33, a front wall 39 and side walls 16 of unit 10. Wall 33 serves to divide sections 15 and 30 and is disposed from the top of unit 10 down toward the bottom 13 to define opening 19 (FIG. 2). Wall 39, on the other hand, extends from the bottom 13 of housing 10 to a location somewhat below its top, and suitable openings 21 are provided in walls 33 and 39 for the by-pass duct 20.

A plate member 38 having opening 36 for receiving the primary filters is welded to the four vertical walls of chamber 30 at a location generally somewhat below the top of housing 10. The forward side of plate 38 is attached to the top of wall 39.

Parallel to, and forward of wall 39, is another vertically extending wall 41 secured between side walls 16. Wall 41 extends from the top of unit 10 downwardly to a point above bottom 13. Transverse walls 39 and 41 and side walls 16 then define section 40. Wall 41 terminates at its lower end at opening 52 of section 40 into section 60.

Surrounding section 30 and 40, and attached to walls 36, 41 and side walls 16 is an inwardly directed horizontal flange 43 which serves, as will be more fully understood below, as a securing surface for cover 44 which in turn defines the plenum 45 above the primary filters and passageway 40. A similar horizontal flange 46 is provided between wall 41, front wall 12 and side walls 16 for attachment of a cover 48 for the secondary filtration chamber 60. Hinges 42 may be used to secure covers 44 and 48 to the top of the filter housing.

Finally, with reference to FIGS. 1 and 3, a horizontal plate 58 is welded or otherwise attached across section 60 somewhat below the level of cover 48 and generally coplanar with plate 38 covering section 30. Plate 58, like plate 38, is provided with openings 57 for mounting the secondary filters. The area between cover 48 and plate 58 defines the secondary filter plenum 56. A duct 63 passes through front wall 12 of unit 10 from plenum 56, leading to the fan or vacuum pump through hose 169, as will be more fully understood shortly hereafter. Unit 10 then is a generally enclosed rectangular box having inlet openings 24 and 25 and an outlet opening 63.

Referring now to FIGS. 2 and 3, housing 10 of FIG. 1 is shown connected to a main collection chamber 65. Collection chamber 65 may be a rectangular chamber defined by rear door 66, front wall 67, bottom 68 and top 69. The side walls are not shown. As discussed above in connection with the construction of housing 10, chamber 65 also may be constructed of reinforced sheet metal or other materials suitable for flat-walled vacuum chambers. The vacuum in chamber 65 may be in the range of 10–20 inches of mercury, and one skilled in the art could readily select the proper construction materials.

Located rearwardly of chamber 65 is a flexible hose 73 which may be of any desired length or configuration for being positioned above the material to be drawn into chamber 65. Hose 73 is attached through the rear of chamber 65 by means of a gasketed seal 74. Other openings such as 74' may be provided at other locations on chamber 65 for allowing greater flexibility in hose attachment. If opening 74' were to be used, opening 74 could be closed with a suitable cover, or in some instances, both openings could be employed simultaneously.

Rear door 66 is preferably pivotally attached to top 69 by a hinge 76 so as to allow opening of the door for debris removal. The particular configuration of the chamber, access door and hose form no part of the present invention and other modifications known to the art can be used. For example, if the entire unit is to be used for loading rather than debris collection, chamber 65 could be supplied with a conveyor means in bottom wall 68 for continuously transporting the material sucked into the chamber to a central collection site, a truck or a conveyor belt. Pneumatic or screw conveyors are examples of such modifications. Also, if a high degree of separation in chamber 65 is desired, the entire chamber could be replaced by a centrifugal separator, which separator could also be equipped with a transport or conveyor means. A properly designed centrifugal separator would allow a greater percentage of particulate material to be retained in chamber 65.

FIG. 2 also shows a hoist 78 pivotally mounted to top wall 69. Hoist 78 may perform several functions. A hook 71 of hoist 78 is designed for being secured to a bracket 72 on hose 73 or to a bracket 77 on rear door 66. By selectively attaching the hoist to one of the brackets, hoist 78 can be used to mainpulate hose 73 or to open rear door 66. A latch means 75 which is exteriorly mounted to bottom 68 of chamber 65 serves to lock rear door 66 to the top, bottom and side walls of chamber 65. Suitable gasket means, (not shown) can also be used to insure a vacuum tight seal between the pivotably mounted door and the remainder of chamber 65.

The manner of connecting chamber 65 to housing 10 will now be described. While the particular embodiment shown in FIGS. 1–3 provides the capability of selecting the flow path of the vacuum air stream by manipulations performed in chamber 65, other means for selecting the flow path could also be used. The top area of chamber 65 adjacent the front wall 67 is divided into two longitudinal passageways leading to a downwardly directed extension 80 of top wall 69, and selection means are provided internally of chamber 65. Extension 80 terminates in a rectangular surface 82 which mates with surface 23 surrounding the openings to bag housing 10. A gasket 81 insures an air-tight seal between housing 10 and chamber 65. The combination is so designed that the openings of the housing mate with the passageways of the chamber, even after tilting the chamber as will be later described. Any other suitable connecting means may be employed between chamber 65 and housing 10. For example, if chamber 65 is to be separated from housing 10, a flexible hose could be provided in place of the connecting means shown in the figures. A first longitudinal passageway 84 at the top of chamber 65 is defined by the top wall 69, the remote side wall and a horizontal wall 85 and opens into the interior of chamber 65 through opening 86. This passageway serves to connect the interior of chamber 65 to opening 24 of housing 10 when solid material is being collected in chamber 65. Opening 86 may be closed by a cover 89 which is pivotally attached to bracket 88. The other end of cover 89 can be secured to bracket 87 when liquids are being collected. Gaskets (not shown) can be provided to insure an air-tight seal when cover 89 is secured between brackets 87 and 88 thereby closing opening 86.

The second longitudinal passageway 92 (FIG. 3) leads to opening 25 of housing 10 and is employed when liquids are being collected. Passageway 92 is defined by top wall 69, the near side wall of chamber 65 and a vertical wall 94. Opening into passageway 92 is another vertical passageway 93 extending up along front wall 67 from a float chamber 95 attached to front wall 67. Vertical wall 94 extends downwardly from the top of chamber 65 to a point above float chamber 95, thereby defining passageway 92. Within chamber 95, which is open at its lower end, is a float 96 having a rod 97 connected through an opening 98 of chamber 95 to a cover plate 100 by hinge 101. When liquids are being collected, cover plate 100 is generally horizontal as shown in FIG. 3 and float 96 is located at the bottom of its retaining chamber 95. Cover 100 is hinged adjacent the front wall 67 by hinge 102. As liquids reach a predetermined height in chamber 65, the float 96 will begin to rise, at the same time raising the interior end of cover 100 so that it approaches the lower end of wall 94. When cover 100 nears the lower end of wall 94, the air stream flow through passageway 93 aids in complete closure of the passageway and prevents liquid from entering the passageway. Cover 100 is mechanically locked to the lower end of wall 94 when solids are being collected. Any other suitable float or valve arrangement may be employed to prevent liquids from entering the filter bag housing.

Although the preferred embodiment of the invention described in connection with the figures shows covers 89 and 100 as the only means for selecting the flow paths into either openings 24 and 25, any other suitable means can be employed. For example, instead of providing two separate passageways having extension 80, a single passageway from the interior of chamber 65 could be connected directly to plate 23 of housing 10 and means could be provided on housing 10 for selectively closing openings 24 and 25. This could be accomplished by providing a hinged cover between the openings. The advantage of the preferred system, however, is that selection of the air stream flow path can be accomplished without separating extension 80 from plate 23.

In the illustrative embodiment of FIGS. 2 and 3, means are shown for elevating the front of chamber 65 for discharging collected material through rear door 66. FIGS. 2 and 3 show the bag housing 10 and chamber 65 in a stationary environment and supported on piers 105 which may be constructed of concrete or steel. Housing 10 is attached to support pier 105 by bolts 106, while chamber 65 is pivotally supported at its rearward end by a pair of mating brackets 90. Located intermediate the ends of bottom wall 68 of chamber 65 is a bracket 108 mounted to bottom 68. A hydraulic jack 110 is rotatably mounted to bracket 108 and also to a bracket 109 on an adjacent support pier 105. The hydraulic cylinder and brackets are so arranged that upon extension of the piston 111 of hydraulic cylinder 110, by application of power from a hydraulic fluid source (not shown), the forward end of chamber 65 will be elevated to facilitate removal of collected material. Other suitable means for elevating the forward end of chamber 65 can be used, such as, for example, screw or hydraulic jacks. The arrangement using support piers is illustrative and different means can be employed if chamber 65 and housing 10 are to be mobile, i.e., mounted on a tractor or truck chassis. Examples of elevating means for truck mounted chambers are well known to the art, i.e., those used for dump trucks, garbage collecting vehicles, etc.

Reference is now made to the bag housing 10 for a description of the filtration system of the illustrated embodiment. Tubular fabric filter bags 120 are supported by plate 38 in the primary filter section 30. Bags 120 are themselves internally supported by a cylindrical wire frame 121 to prevent bag collapse under vacuum conditions. Suspended by plate 58 in the secondary filtration section 60 is a second plurality of similar wire supported bags 140. Bags 120 and 140 may be identical, but in a preferred embodiment of the invention, the average pore size of the bags is different. It has been found that in order to obtain substantially complete dust removal under ordinary conditions an average pore size of approximately 1 micron is required. Therefore, bags 120 should be constructed of a material which has an average pore size of approximately 1 micron. Either woven or felted materials can be suitably employed, and a felted material with pores in the range of 0.5 to 2 microns is satisfactory for most uses. On the other hand, secondary filter bags 140 are used, as described above, mainly to protect the vacuum pump should the primary bags fail. For this reason, it is not necessary that bags 140 have so small a porosity. It has been found that bags having an average porosity of approximately 10 microns are suitable for use as the secondary bags, since particles less than approximately 10 microns in size will not do significant damage to conventional vacuum pumps in the time it would take the operator to stop the machine and make whatever repairs to the primary bags are necessary. The particular construction of the filter bags and the pore sizes mentioned above are illustrative only and the invention should not be limited to any particular filter material or pore size. It is obvious that under varying circumstances, entirely different parameters might be selected and for some uses a small average porosity may not be necessary at all. Therefore, the choice of the porosity for bags 120 and 140 is a design choice.

Each of bags 120 and 140 is held in place by a top retainer ring 123 which exceeds in diameter the hole and over which the fabric of each bag is stretched. After the bags are dropped through their hole, a venturi 126 is inserted into the bag opening and is in turn supported by the retainer ring. As will be apparent shortly, the venturi enhances the bag cleaning efficiency of the reverse flow air cleaning system. Securing all of the bags and venturis in place is a plurality of rotatable clamping plates 127 suitably disposed on plates 38 and 58. The center of each plate 127 is secured through either plate 38 or plate 58 by a bolt 128, passing through its bag support plate and into a strip of metal 129 welded or otherwise attached to the support plates. Should a bag in either the primary or secondary filtration sections fail, the bag may be simply removed by loosening bolts 128 and turning the clamping plates 127 so that their contacting protrusions are turned away from the bags. The venturi 126 is then removed and the bag lifted out and discarded or repaired.

Suspended within plenums 45 and 56, as can be seen from FIGS. 2 and 3, are manifold or blow pipes 150 and 160, respectively. Actually such pipes are suspended over each row of tubular filter bags 120 and 140 even though only two such pipes can be seen in the drawings. The pipes include holes 151 and 161, respectively, located centrally above the bag openings. Pipes 150 and 160 pass outwardly through covers 44 and 48 of plenums 45 and 56 and are sealed therethrough in a manner not shown. Pipes 151 and 160 terminate outside housing 10 at valves 155 and 165. Each of the other pipes suspended over the filter bags are similarly connected to valves 155 and 165. A continuous path then is provided between the hole of each pipe, the pipe itself, and the valves. Couplings 153 and 163 are provided respectively in pipes 150 and 160 to allow for rapid disconnection of the pipes from the valves. While the figures illustrate the valves being mounted above bag housing 10, it is preferred that the valves be mounted through the side walls 16 of housing 10. This would leave covers 44 and 48 free of obstruction to facilitate access to plenums 45 and 56 for bag repair or inspection.

The operation of the illustrated embodiment of the invention will now be described, first in connection with the collection of dry material. Dust resulting from such collection passes through passageway 84 and passageway 17 of section 15 of bag housing 10 through inlet opening 24. The flow of such air is shown in FIG. 2 to pass around flange 19 of wall 33 and up to and through the walls of primary fabric bags 120. The air, then being substantially free of dust, passes through plenum 45 of the primary bag section 30 through section 40, around flange 52 of wall 41 and up to and through the walls of secondary filter bags 140. The filtered air then passes through the secondary bag plenum 56 and leaves the bag housing 10 through duct 63 to the vacuum pump 170. During the cleaning or loading operation, the bag cleaning mechanism is operated intermittently, for example, in one-tenth of a second intervals, to blast any accumulations of dirt off of bags 120 toward the opening 34 for removal. The back flushing is accomplished simultaneously with the continuous operation of the vacuum pump so that it is unnecessary to stop the cleaning or loading operation. Fine dust particles contacting the primary bags 120 would tend to accumulate during the intervals between back flushing and form loose cakes which are easily knocked off by the pulse of back flushing air directed into the bags through holes 151 of pipes 150. Should any of bags 120 fail and allow dust to pass into the primary filter plenum 44 and section 40, the major portion of such dust would accumulate on the exterior surface of bags 140, and for this reason a back flushing of that bag may also be provided in the preferred embodiment. The secondary bag back flushing would result in the accumulated dust being dropped to the bottom of the secondary filter section 60 and removal of any such accumulation is accomplished through removal door 72 at the bottom thereof. Periodic checks by opening door 72 would indicate to the operator if any failures had occurred in the primary bags, because no accumulation should occur in the absence of primary bag failure. In another embodiment of the invention, the secondary back flushing provision may be eliminated or manual back flushing of the secondary bags can be employed. As stated hereinbefore, the primary function of the secondary filter bags is protection of the vacuum pump, rather then elimination of dust discharged into the atmosphere. However, even the secondary bags would reduce some dust emissions in the event of primary bag failure.

In collecting liquids, opening 86 is closed and the cover 100 of duct 93 is opened. This makes operable the by-pass system wherein the primary bags 120 would be by-passed by the air stream and would be protected from the moist air passing through housing 10. The moist air would pass directly through duct 20 to the secondary bags 140 and into secondary plenum 56 to blower 170.

Should it later be desired to again collect dry material, the procedure just outlined would be reversed so as to direct dust laden air into the primary bag section 30. The flow of dust laden air would pass through dry bags 120. It is also contemplated that by using the device shown in the embodiment illustrated in FIGS. 1–5, the flow of dry air through housing 10 would quickly dry bags 140 and prevent caking on bags 140, should primary bags 120 later fail.

The compressed air source and timers for valves 155 and 165 are not shown and the detailed construction of the valve mechanism is also not shown. In the preferred embodiment of the invention, the cleaning of individual bags is accomplished sequentially, i.e., one row of bags is cleaned and a cyclical timer is employed to direct the cleaning blasts of air through one row at a time and then cycle the cleaning blasts to the original row. Reference is here made to various U.S. patents which describe in detail such cyclical filter bag cleaning timers. See U.S. Pat. No. 3,436,899 issued to J. Pausch on Apr. 8, 1969 for "Supersonic Cleaning of Filter Media," U.S. Pat. No. 3,541,631 issued on Nov. 24, 1970 to B. M. Kluge et al for "Industrial Vacuum Loader and Cleaner," and U.S. Reissue Pat. No. 24,954 issued Mar. 8, 1961 to H. Church for "Apparatus for Filtering Solids from Gas-Solid Suspensions." The filtration system disclosures of these patents are hereby expressly incorporated by reference into this specification.

While the back flushing mode has been shown in the preferred embodiment of applicant's invention, other means for cleaning filters may also be employed. Two examples of alternative filter systems are those employing bag shakers to shake accumulated dirt from the bag surfaces and unsupported bag systems which expand in a wave-like manner to flake accumulated dirt off of the bags.

Applicant's invention is primarily directed to a bag housing which is adaptable for both mobile and stationary environments. Collection chamber 65, bag housing 10, vacuum pump 170, etc. may be variously arranged and the bag housing 10 itself may be variously constructed to fit space requirements of existing vacuum loaders or cleaners. Servicing and inspection of the housing is minimized because a system is provided for preventing blower damage should a primary filter bag 120 fail, and primary bags 120 should have an increased lifetime since they are not involved in the loading or collecting of liquids into chamber 65. A control panel 200 is also schematically illustrated in FIGS. 2 and 3, but the electrical connections of the panel to the various parts of the machine are not shown since the details of the electrical connection would be obvious to one skilled in the art. In the schematic example, six control knobs (A-F) are shown. Knob A could be connected to the tail gate latch 75 for automatic extension of the latches to allow door 66 to be opened. Knob B could be connected to hoist 78 for hose manipulation or door opening, even if the chamber were not elevated. Knob C could be used for controlling the velocity of the vacuum pump 170. As previously disclosed, pump 170 may be a positive displacement pump, since the present invention provides greater protection to enable the economical operation of such pumps. Knob D could control the back flushing of bags 120 and 140 so that one, both or none of the bag sections are cleaned depending on the particular cleaning or loading jobs. Finally, knobs E and F could be employed if a mechanical system for operation of covers 89 and 100 were included. Such a system was not shown in the figures, but it should be obvious to one skilled in the art that any mechanical system for closing the openings to passageways 84 and 92 could be employed. So while the invention has been described in connection with a preferred embodiment thereof, the invention is not to be limited by that description, but is to be limited solely by the claims which follow.

We claim:
1. A vacuum loading or cleaning device comprising:
   a material receiving chamber, said chamber including inlet means and outlet means,
   vacuum pump means connected to said chamber outlet means for creating a vacuum in said chamber and for drawing a high velocity air stream from said chamber inlet means through said chamber to said chamber outlet means,
   filter means interposed between said chamber and said pump means for filtering fine particulate material from the air stream passing from said chamber to said pump means, said filter means comprising:
   a housing having two inlet means coupled with said chamber outlet means and a housing outlet means coupled to said vacuum pump means, air stream directing means within said housing defining two air stream flow paths through said housing, one of said flow paths connecting one of said housing inlet means to said housing outlet means and the other of said flow paths connecting the other of said housing inlet means to said housing outlet means, filters in said housing for filtering fine particulate material from the air stream passing through said housing, said filters comprising a first and a second portion, said first portion and said second portion of said filters being arranged in said housing for filtering in series the air stream passing through said first flow path, said second flow path bypassing said first portion of said filters but including said second portion of said filters means for selectively controlling the air flow from said chamber outlet means to said housing outlet means through one of said flow paths.

2. The invention set forth in claim 1 wherein said chamber outlet means comprise first and second outlets, said first outlet being connected to said one housing inlet means and said second outlet being connected to the other of said housing inlet means, said chamber outlets being selectively closable whereby air passing through said chamber may leave said chamber through only one of said chamber outlets.

3. The invention set forth in claim 2 further including first and second duct means coupling the interior of said chamber to said first and second chamber outlets respectively, one end of said first duct means being coupled to said first chamber outlet and the other end of said first duct means being open to the upper portion of said chamber interior, and one end of said second duct means being coupled to said second chamber outlet while the other end of said second duct means is open to said chamber interior at a location therein below said other end of said first duct means.

4. The invention set forth in claim 3 wherein said second duct means is selectively closeable by a float valve means disposed at said other end of said second duct means, whereby said second duct means is closed to the passage of air if liquid is being collected in said chamber and said liquid reaches a predetermined height in said chamber.

5. The invention set forth in claim 4 wherein said filters comprise tubular fabric filter bags suspended within said housing so that the air stream passing through said housing flows from the exterior of said bags to the interior of said bags and fine particulate material accumulates on the exterior surface thereof.

6. The invention set forth in claim 2 wherein said air stream directing means define:

a first vertical section of said housing, said first section being divided into first and second vertical passageways, the first one of said passageways connected to said one inlet means and the second one of said passageways connected to said other inlet means, a second vertical section adjacent said first section and containing said first portion of said filters, said second vertical section being connected to said first passageway, a third vertical section adjacent said second vertical section and defining a third passageway leading from the upper portion of said second vertical section to the lower portion of, a fourth vertical section adjacent said third vertical section and containing said second portion of said filters said fourth vertical section connected to said third passageway and said housing outlet, and a first horizontal passageway passing through and beneath said second vertical section and connected to said second passageway and said fourth vertical section.

7. The invention set forth in claim 6 wherein said filters comprises tubular fabric filter bags suspended within said second and fourth vertical sections so that the air stream passing through said housing flows from the exterior of said bags to the interior of said bags and fine particulate material accumulates on the exterior surface thereof, and wherein the average porosity of the bags in said fourth vertical section exceeds the average porosity of the bags in said second vertical section.

* * * * *